(12) United States Patent
Qian et al.

(10) Patent No.: US 8,504,319 B2
(45) Date of Patent: Aug. 6, 2013

(54) METHODS, SYSTEMS, AND PRODUCTS FOR REFLECTIVE MAINTENANCE

(75) Inventors: Zhiqiang Qian, Holmdel, NJ (US);
Paritosh Bajpay, Edison, NJ (US);
Jackson Liu, Middletown, NJ (US);
Michael John Zinnikas, North Brunswick, NJ (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 386 days.

(21) Appl. No.: 12/891,845

(22) Filed: Sep. 28, 2010

(65) Prior Publication Data
US 2012/0078565 A1    Mar. 29, 2012

(51) Int. Cl.
*G06F 7/00* (2006.01)
*G06F 17/30* (2006.01)
*G06F 11/30* (2006.01)
*G06F 17/40* (2006.01)
*G06F 19/00* (2011.01)

(52) U.S. Cl.
USPC .......... 702/117; 73/865.9; 370/241; 375/224; 702/108; 702/182; 702/183; 702/187; 702/189; 707/655; 707/705

(58) Field of Classification Search
USPC .................. 73/865.8, 865.9; 324/73.1, 76.11, 324/113, 500, 537, 759.01; 340/500, 540, 340/635, 653; 370/241; 375/224; 702/1, 108, 702/117, 118, 127, 182, 183, 186, 187, 188, 702/189; 705/101, 7.11, 7.27, 305, 1.1; 707/609, 640, 655, 705

IPC .............. G06F 7/00,11/00, 11/30, 11/32, 17/00, G06F 17/30, 17/40, 19/00
See application file for complete search history.

(56) References Cited

U.S. PATENT DOCUMENTS

| | | | |
|---|---|---|---|
| 2,883,255 A * | 4/1959 | Anderson | 346/34 |
| 3,082,374 A * | 3/1963 | Buuck | 324/73.1 |
| 4,881,230 A | 11/1989 | Clark et al. | |
| 5,481,481 A * | 1/1996 | Frey et al. | 702/82 |
| 5,483,637 A | 1/1996 | Winokur et al. | |
| 6,304,982 B1 | 10/2001 | Mongan et al. | |
| 7,301,909 B2 | 11/2007 | Langevin et al. | |
| 7,516,208 B1 | 4/2009 | Kerrison et al. | |
| 7,702,613 B1 * | 4/2010 | Dankenbring et al. | 707/687 |
| 7,743,304 B2 * | 6/2010 | Volkerink et al. | 714/738 |
| 7,756,048 B2 | 7/2010 | Ahrens et al. | |
| 8,315,760 B2 * | 11/2012 | Costantino | 701/32.1 |
| 8,347,156 B2 * | 1/2013 | Volkerink et al. | 714/724 |
| 2002/0013908 A1 * | 1/2002 | Nishihata et al. | 713/201 |
| 2005/0108577 A1 * | 5/2005 | Nishihata et al. | 713/201 |
| 2005/0172024 A1 | 8/2005 | Cheifot et al. | |
| 2006/0212149 A1 * | 9/2006 | Hicken et al. | 700/94 |
| 2007/0168970 A1 | 7/2007 | Li et al. | |
| 2007/0198881 A1 * | 8/2007 | Volkerink et al. | 714/724 |
| 2010/0088278 A1 | 4/2010 | Wood et al. | |

(Continued)

*Primary Examiner* — Edward Cosimano
(74) *Attorney, Agent, or Firm* — Scott P. Zimmerman, PLLC

(57) ABSTRACT

Methods, systems, and products maintain reflective maintenance records for a network. Test results are mirrored from different testing applications to a centralized testing database. The test results are associated to circuit identifiers. A work order is received that identifies trouble associated with a customer. A circuit identifier associated with the customer is retrieved and, prior to performing a test of a circuit to resolve the trouble, the centralized testing database is queried for the circuit identifier. A test result associated with the circuit identifier is retrieved and the work order is updated with the test result.

20 Claims, 18 Drawing Sheets

U.S. PATENT DOCUMENTS

2010/0100772 A1  4/2010  Troan et al.
2010/0138701 A1* 6/2010  Costantino ...................... 714/49
2011/0145645 A1* 6/2011  Volkerink et al. ............... 714/35

* cited by examiner

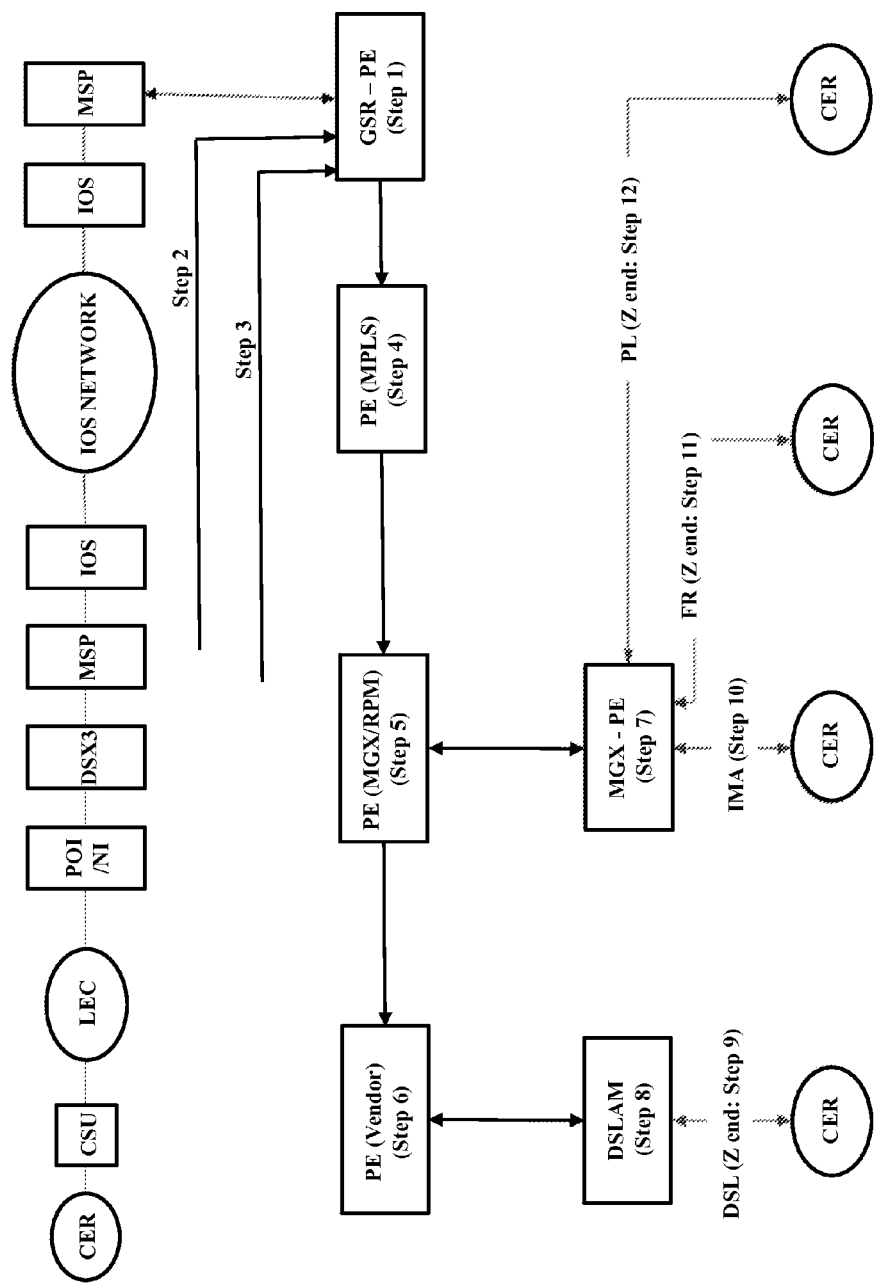
FIG. 11-A

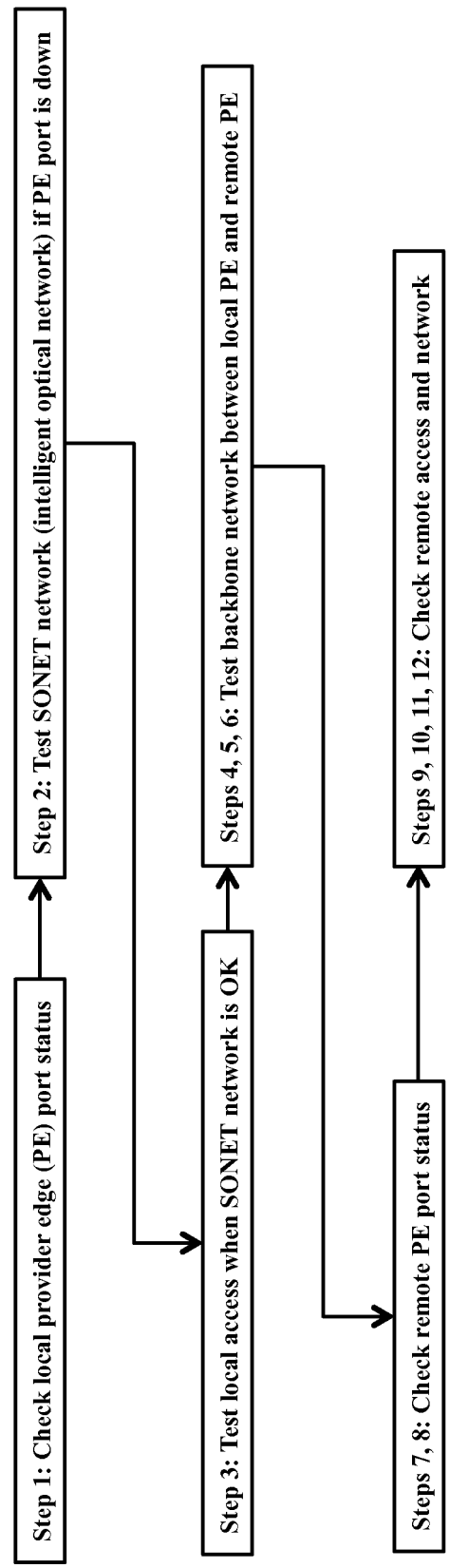
FIG. 11-B

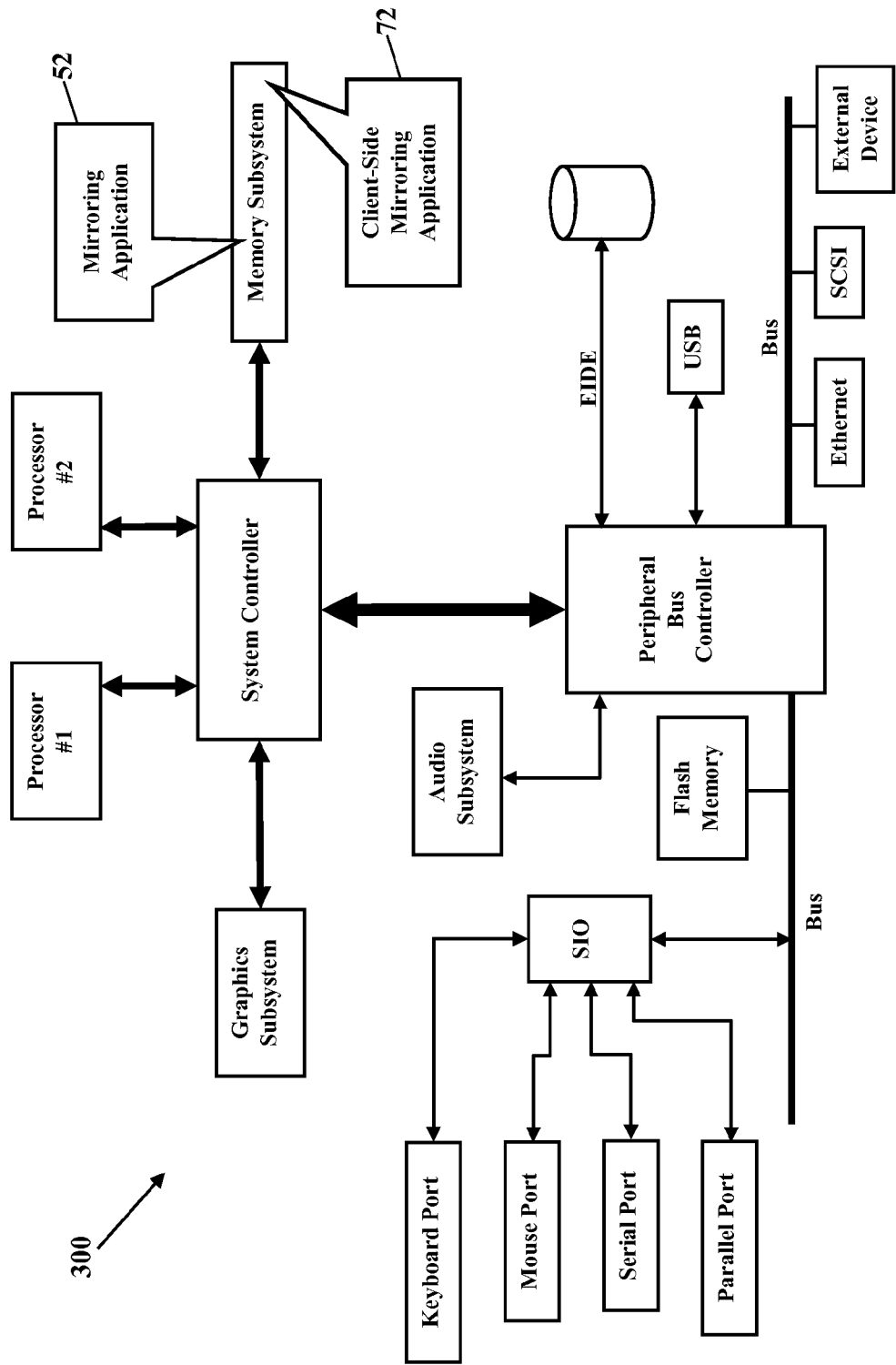

METHODS, SYSTEMS, AND PRODUCTS FOR REFLECTIVE MAINTENANCE

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to communications, error detection, and fault detection and, more particularly, to diagnostic testing, malfunction indication, electrical condition measurement, and error or fault handling.

Automated troubleshooting and testing plays a vital role in network management. Automated troubleshooting and testing may pinpoint problems in a network so that repairs may be quickly commenced. Unfortunately, though, many of these automated tests are duplicates. Many times the same test is executed on the same device or facility, even though the problem has already been identified. Networks often have many software applications that perform automated tests, but the test results are neither shared nor persistent. So, many duplicate tests are unnecessarily executed, and valuable network resources are wasted. Duplicate tests consume limited testing resources making them unavailable for other processes that may need them, i.e. the test and activation of new services. Unnecessary testing lowers productivity whether it be manual in nature or mechanized.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIGS. 11A & B are detailed schematics illustrating a layout and process for reflective maintenance of networks, according to exemplary embodiments;

FIG. 17 is a schematic illustrating a processor-controlled device, according to exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
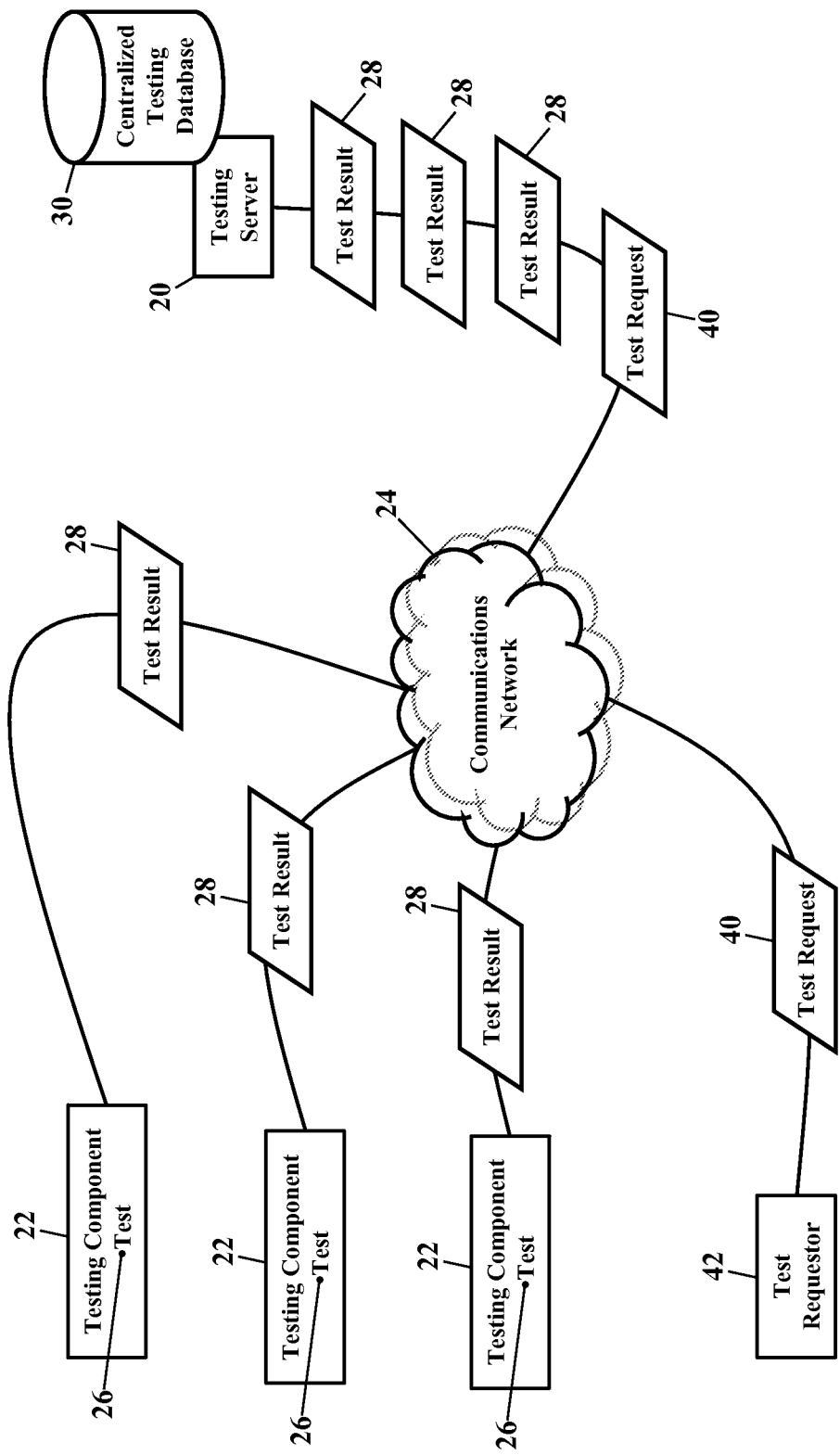
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client-server network architecture that stores reflective maintenance records. A testing server 20 communicates with various testing components 22 via a communications network 24. Each testing component 22 performs one or more tests 26 of any equipment or machine. Each testing component 22 may even test a component or portion of the communications network 24. Regardless, each testing component 22 may then send a test result 28 to the testing server 20. FIG. 1, for simplicity, only illustrates a few testing components 22, but the testing server 20 may receive many test different test results from many different components. The testing server 20 stores each test result 28 in a centralized testing database 30. All the test results 28 may thus be mirrored, or reflected, in the centralized testing database 30. The various test results 28 are thus stored in a central repository for analysis and for retrieval. The test results 28 may be organized and/or grouped, such as according to each testing component 22 (as later paragraphs will explain).

The centralized testing database 30 helps prevent duplicate tests. When a testing component 22 is requested to perform a new test, a test request 40 may be routed to the testing server 20. Instead of passing the test request 40 to the testing component 22, the testing server 20 first checks the centralized testing database 30. The testing server 20 may query the centralized testing database 30 for the test results 28 associated with the testing component 22. If the test results 28 are fresh and relevant (as later paragraphs will explain), then the testing server 20 may decline to authorize the requested new test. The testing server 20, instead, retrieves the test results 28 from the centralized testing database 30 that are associated with the testing component 22. The testing server 20, in other words, retrieves the test results 28 that were mirrored to the centralized testing database 30. The test results 28 from the centralized testing database 30 may then be returned to a test requestor 42. Because the mirrored test results 28 are fresh and relevant, no new test need be performed by the testing component 22. Consequently, the centralized testing database 30 helps prevent unnecessary duplicate testing on the same root cause. Moreover, the centralized testing database 30 conserves equipment and computer resources for other tasks.

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, hybrid-coaxial lines and/or point to point radio channels. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The communications network 24 may even include powerline portions, in which signals are communicated via electrical wiring. The concepts described herein may be applied to any wireless/wireline communications network, regardless of physical componentry, physical configuration, or communications standard(s).

Figure 2:
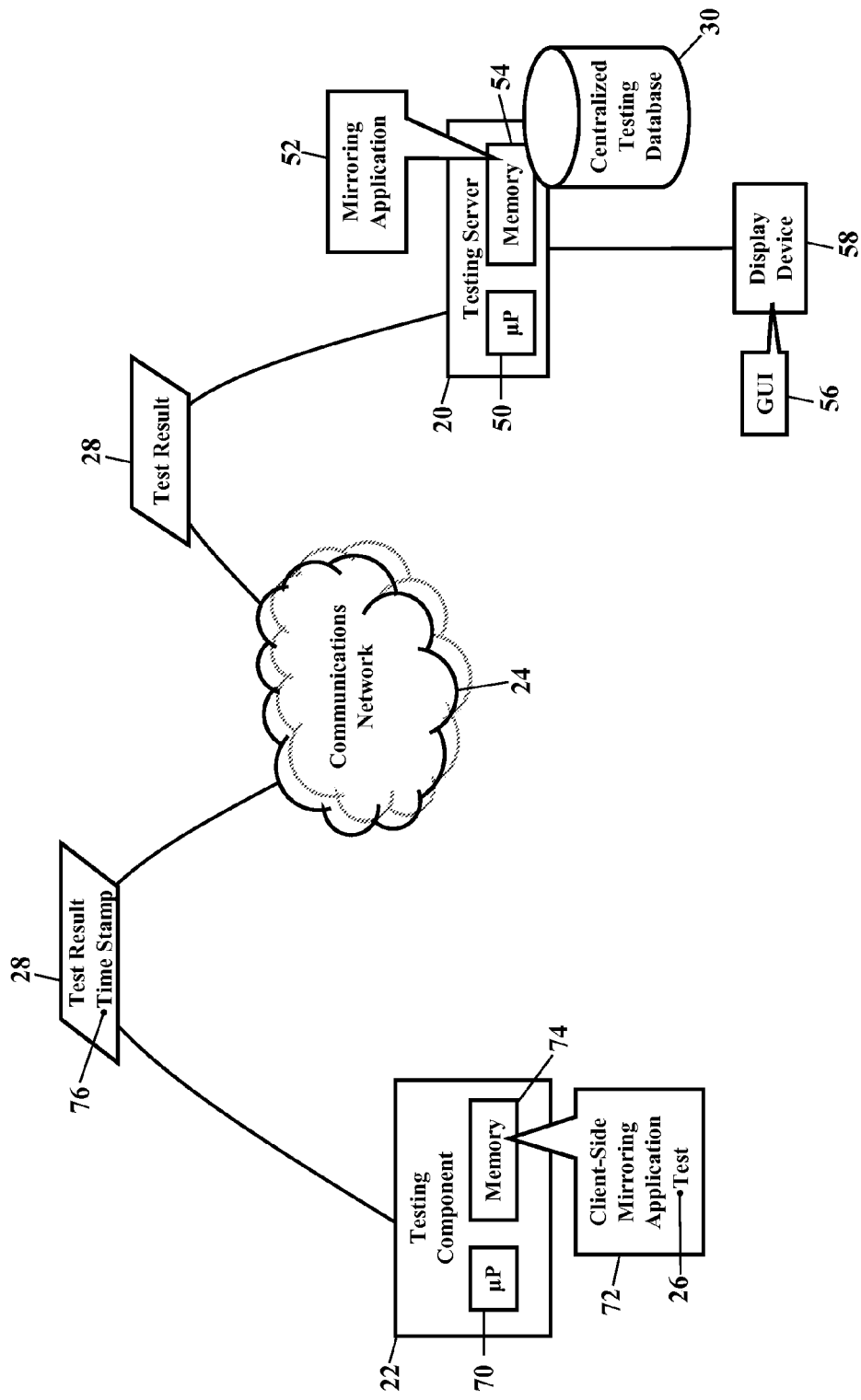
FIG. 2 is a more detailed schematic illustrating the operating environment, according to exemplary embodiments.
Figure 3:
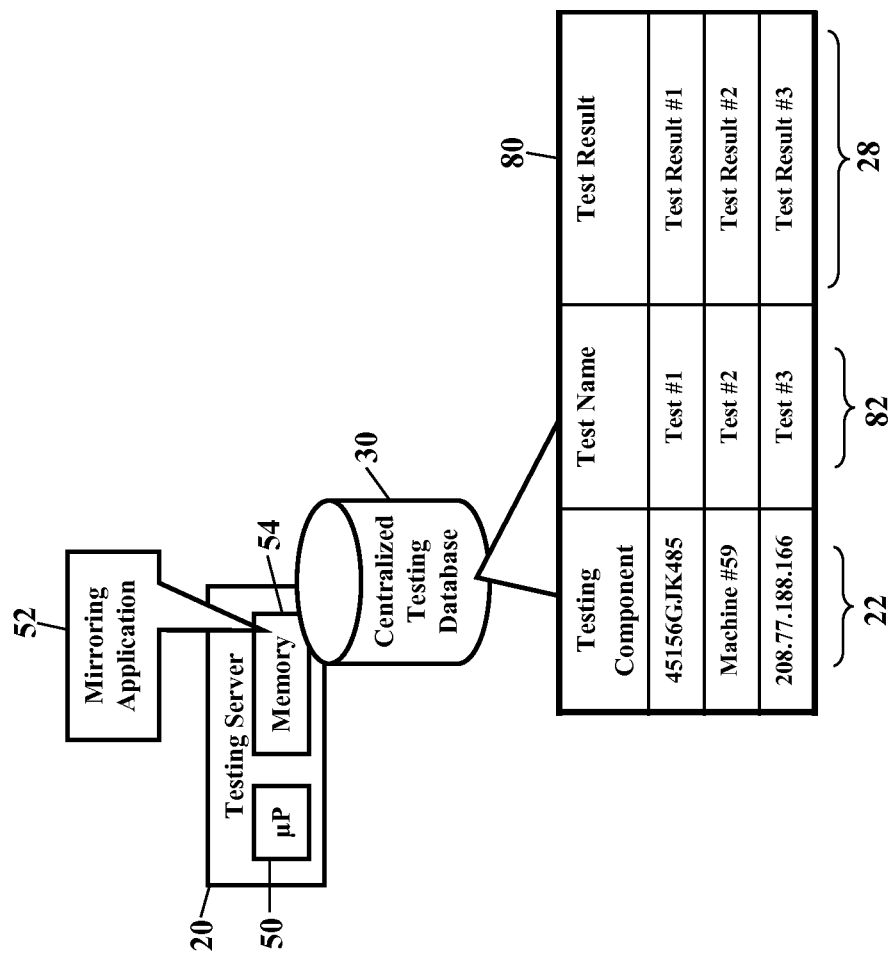
FIGS. 3 and 4 are schematics illustrating a centralized testing database, according to exemplary embodiments.

FIGS. 2 and 3 are more detailed schematics illustrating the operating environment, according to exemplary embodiments. Here the testing server 20 has a processor 50 (e.g., "µP"), application specific integrated circuit (ASIC), or other component that executes a mirroring application 52 stored in a memory 54. The mirroring application 52 may cause the processor 50 to produce a graphical user interface ("GUI") 56. The graphical user interface 56 is illustrated as being visually produced on a display device 58, yet the graphical user interface 56 may also have audible features. The mirroring application 52, however, may operate in any processor-controlled device, as later paragraphs will explain.

The testing server 20 receives the test result 28 from the testing component 22. The testing component 22 may also have a processor 70 (e.g., "µP"), application specific integrated circuit (ASIC), or other component that executes a client-side mirroring application 72 stored in a memory 74. The client-side mirroring application 72 may cooperate with the server-side mirroring application 52 to perform the test 26 and to send the test result 28 to an address associated with the testing server 20. Whenever the testing component 22 performs the test 26, the test results 28 are copied or mirrored to the testing server 20. The client-side mirroring application 72, for example, may send the test result 28 in a message to the Internet Protocol address associated with the testing server 20. The test result 28 may include a time stamp 76. The time stamp 76 may be added by the client-side mirroring application 72 and may thus represent a date/time that the test result 28 was generated by the testing component 22. The time stamp 76, however, may be added by the mirroring application 52 upon receipt at the testing server 20.

FIG. 3 illustrates the centralized testing database 30, according to exemplary embodiments. When the testing server 20 receives the test result 28, the testing server 20 may store the test result 28 in the centralized testing database 30. The mirroring application 52 may then associate the test result 28 to the testing component 22 that reported the test result 28. The centralized testing database 30 is illustrated as being locally stored in the memory 54 of the testing server 20, but the centralized testing database 30 may be remotely accessed and maintained at any location in communications network (illustrated as reference numeral 24 in FIGS. 1-2). Regardless, the centralized testing database 30 stores the test result 28 associated with the testing component 22. FIG. 3, for example, illustrates the centralized testing database 30 as a table 80 that maps, relates, or otherwise associates the test results 28 to different testing components 22. The testing server 20 may thus associate each test result 28 to the corresponding testing component 22 in the centralized testing database 30. As FIG. 3 also illustrates, each test result 28 may also be associated to the test name 82 that was performed by the testing component 22. As those of ordinary skill in the art understand, the testing component 22 may run or perform more than one test. A single machine or piece of equipment, for example, may run several different diagnostic tests to resolve errors or to determine capabilities. The centralized testing database 30, then, may associate the test results 28 to the particular test name 82 that was performed by the testing components 22.

Figure 4:
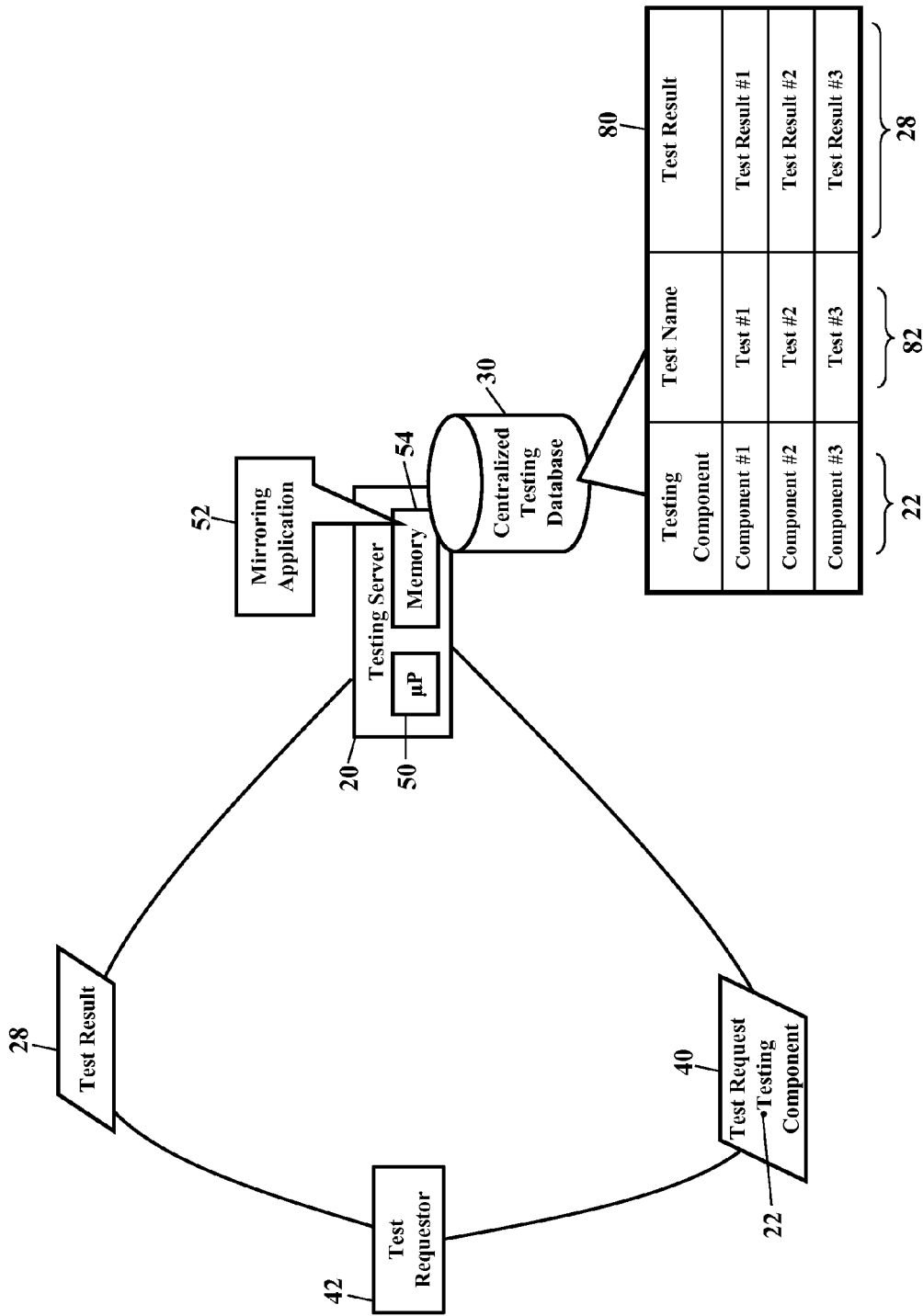

FIG. 4 is a schematic further illustrating the centralized testing database 30, according to exemplary embodiments. When the test 26 is desired, the test requestor 42 issues the test request 40. The test requestor 42 may be a human operator at a machine, or the test requestor 42 may be a computer troubleshooting a problem. The test requestor 42, in other words, may be a diagnostic software application that automatically performs some diagnostic test. The test request 40 may be a message that includes information identifying the testing component 22 for which the test is desired. Regardless, the testing server 20 is informed of the test request 40. The testing server 20 may be configured to intercept all test requests. All test requests, for example, may route to the testing server 20 before being forwarded to the appropriate testing component. The testing server 20, instead, may be configured to intercept only certain test requests issued from certain devices, departments, or people.

The testing server 20 may first check the centralized testing database 30. The mirroring application 52 may query the centralized testing database 30 for the testing component 22 identified in the test request 40. If the centralized testing database 30 has an entry related to the testing component 22, then the testing server 20 may retrieve the corresponding test result 28 associated with the testing component 22. The testing server 20, in other words, retrieves the test result 28 that was copied or mirrored to the centralized testing database 30. The test result 28, retrieved from the centralized testing database 30, may then be sent in a message to the test requestor 42. Because the test result 28 was retrieved from the centralized testing database 30, no new test need be performed by the testing component 22.

Figure 5:
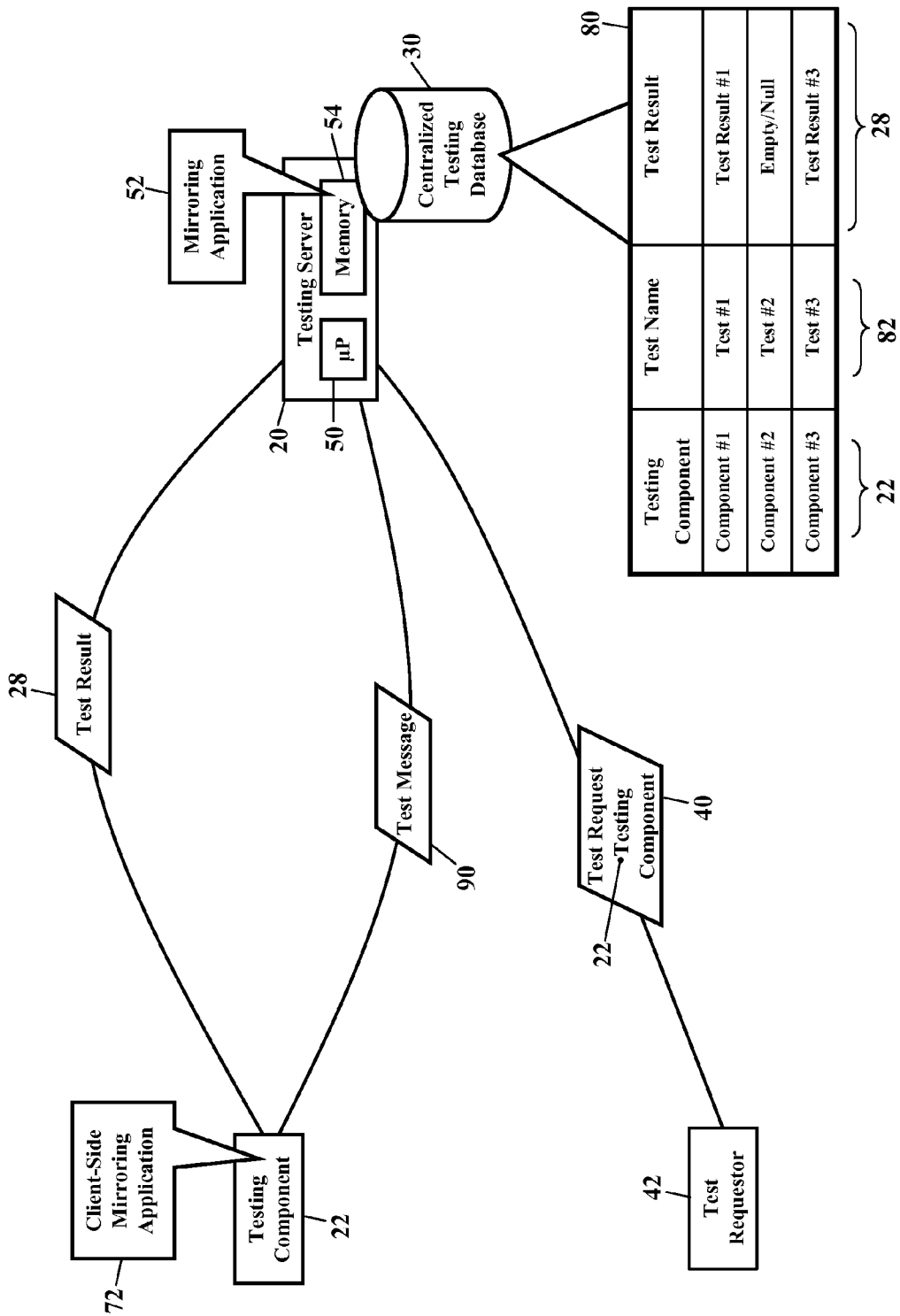
FIG. 5 is a schematic illustrating a testing scheme, according to exemplary embodiments.

FIG. 5 is a schematic illustrating a testing scheme, according to exemplary embodiments. When the testing server 20 is informed of the test request 40, the testing server 20 may first check the centralized testing database 30 for the corresponding test result 28 associated with the testing component 22. If no test result 28 exists, then the mirroring application 52 may authorize an automated test.

As FIG. 5 illustrates, the mirroring application 52 causes the processor 50 to query the centralized testing database 30. The centralized testing database 30 is queried for the testing component 22 identified in the test request 40. If the testing component 22 is not found in the centralized testing database 30, then the mirroring application 52 may authorize an automated test. Or, if the testing component 22 is found in the centralized testing database 30, but an associated database entry is empty or null, then the mirroring application 52 may authorize an automated test. The mirroring application 52 may thus cause the processor 50 to send a test message 90 to the testing component 22. The test message 90 communicates to an address associated with the testing component 22, and the test message 90 instructs the testing component 22 to perform the requested automated test. The testing component 22 performs the requested test, and the client-side mirroring application 72 sends the test result 28 to the testing server 20. The testing server 20 stores the test result 28 in the centralized testing database 30 and the mirroring application 52 associates the test result 28 to the testing component 22. The testing server 20 may also return the test result 28 to the original test requestor 42.

Figure 6:
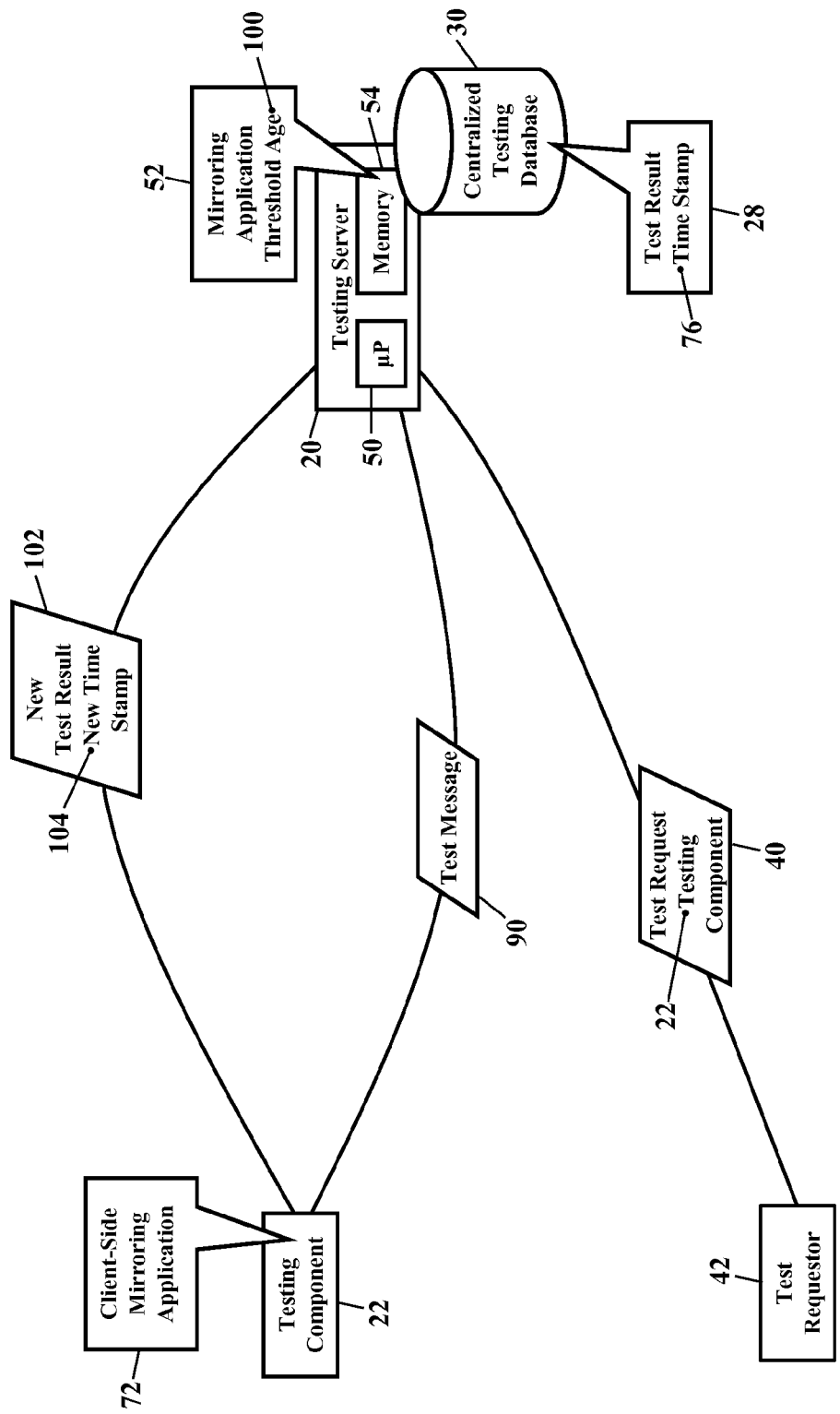
FIG. 6 is a schematic illustrating stale test results, according to exemplary embodiments.

FIG. 6 is a schematic illustrating stale test results, according to exemplary embodiments. Whenever the testing component 22 performs a test, the test results 28 are copied or mirrored to the testing server 20. Because the test result 28 may include the time stamp 76, the mirroring application 52 may compare the time stamp 76 to a threshold age 100. The threshold age 100 may be a configurable or definable parameter for retrieving the test result 28. If the test result 28 is newer or younger than the threshold age 100, then the testing server 20 may retrieve the corresponding test result 28 and send the test result 28 to the test requestor 42. When, however, the test result 28 is older than the threshold age 100, then the mirroring application 52 may decline to send the test result 28 to the test requestor 42. Because the stored test result 28 is older than the threshold age 100, the test result 28 may be too old, or stale, and thus unreliable. The mirroring application 52 may, instead, may send the test message 90 to the testing component 22 to authorize a new test. The testing component 22 performs the new test, and the client-side mirroring application 72 sends a new test result 102 to the testing server 20. The new test result 102 may also include a corresponding new time stamp 104 that indicates a date and time that the new test result 102 was generated. The testing server 20 stores the new test result 102 in the centralized testing database 30, and the mirroring application 52 associates the new test result 102 to the testing component 22. The mirroring application 52, in other words, may replace the older test result 28 with the new test result 102 in the centralized testing database 30.

Figure 7:
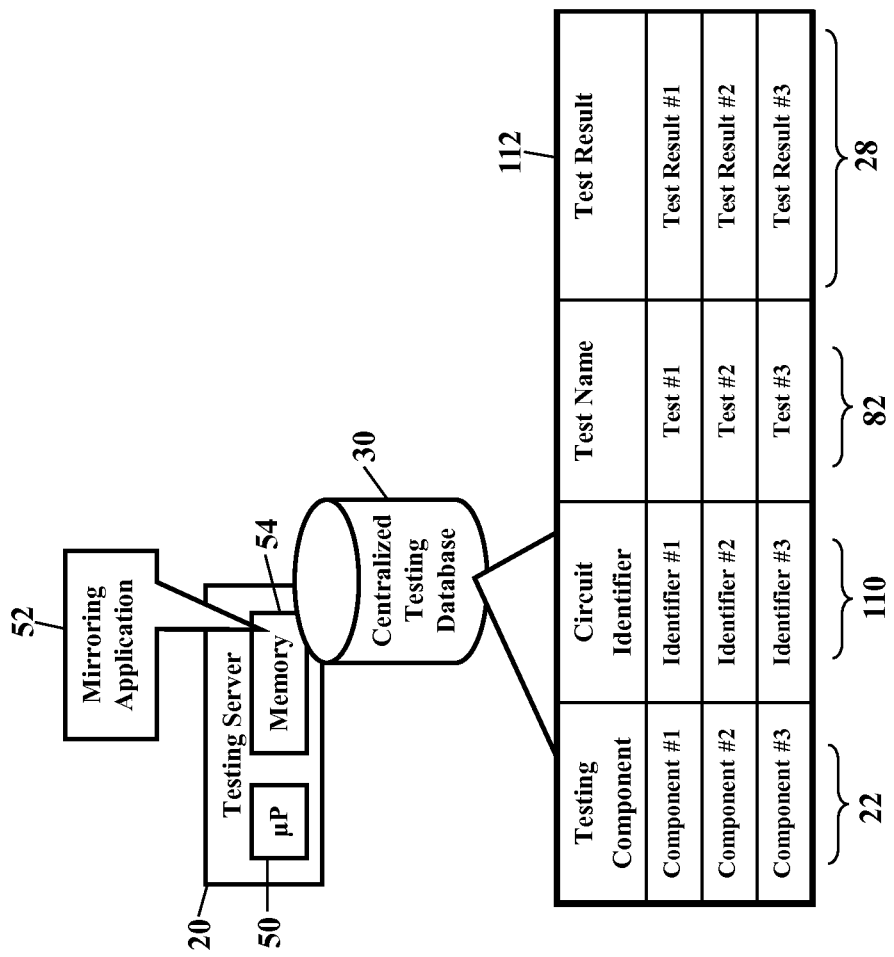
FIG. 7 is another detailed schematic illustrating the centralized testing database and network circuit identifiers, according to exemplary embodiments.

FIG. 7 is another detailed schematic illustrating the centralized testing database 30, according to exemplary embodiments. Here the test results 28 may be sorted and/or grouped by network circuit identifiers 110. Errors in communications networks (such as the communication network 24 illustrated in FIGS. 1-2) are often diagnosed by automated testing. Many different software applications perform automated testing of different equipment and physical lines within the communication network 24. All these test results may thus be reported and mirrored to the centralized testing database 30.

FIG. 7, for example, illustrates the circuit identifiers 110. Each circuit identifier 110 may be some alphanumeric combination that identifies at least a portion of the communication network (illustrated in FIGS. 1-2 as reference numeral 24). When a customer is served by a wired and/or wireless portion of the communication network 24, the serving portion is called a circuit. When a circuit, or a portion of a circuit, is tested, the test results 28 may be stored in the centralized testing database 30 and associated to the corresponding circuit identifier 110. The Common Language Circuit Identifier (or "CLCI"), for example, may be used to identify the test results 28 associated with a circuit serving a customer. If the customer has a problem with network service, the circuit serving the customer may be identified by the corresponding circuit identifier (or "CLCI"). Because the Common Language Circuit Identifier is well known to those of ordinary skill in the art, this disclosure need not further explain the Common Language Circuit Identifier.

The test results 28 may be associated to the circuit identifiers 110. When the testing server 20 receives the test result 28, the mirroring application 52 may associate the test result 28 to the corresponding circuit identifier 110. FIG. 7, for example, again illustrates the centralized testing database 30 as a table 112 that maps, relates, or otherwise associates the test results 28 to different circuit identifiers 110. The table 112 may also associate the test results 28 to the testing component 22 and to the test name 82 (as earlier paragraphs explained). Should the testing server 20 receive, or be notified of, a test request involving a circuit identifier 110, the mirroring application 52 need only query the centralized testing database 30 for the circuit identifier 110. If the centralized testing database 30 stores the test results 28 for the corresponding circuit identifier 110, then a new test of the circuit need not be performed. The testing server 20, instead, retrieves the test results 28 associated with the circuit identifier 110. The mirrored test results 28 from the centralized testing database 30 may be retrieved. A duplicate test on the same root cause has been avoided, and network resources have been conserved.

Figure 8:
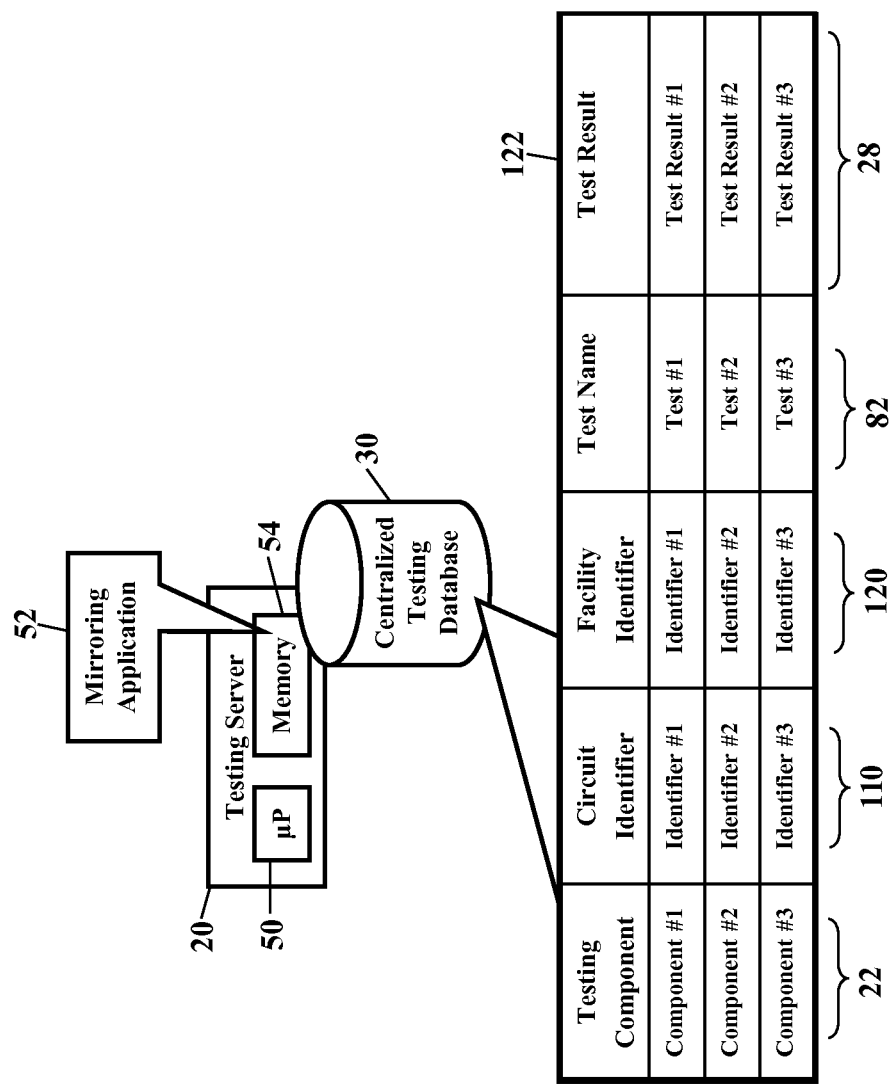
FIG. 8 is another detailed schematic illustrating the centralized testing database and facility circuit identifiers, according to exemplary embodiments.

FIG. 8 is another detailed schematic illustrating the centralized testing database 30, according to exemplary embodiments. Here the test results 28 may additionally or alternatively be sorted and/or grouped by facility identifiers 120. Each facility identifier 120 may be some alphanumeric combination that identifies at least a portion of equipment and/or facilities serving a customer. When equipment or facilities are tested, the test results 28 may again be stored in the centralized testing database 30. Here, though, the test results 28 may be associated to the corresponding facility identifier 120. The Common Language Facility Identifier (or "CLFI"), for example, is another common coding scheme that uniquely identifies the facilities serving a customer. Again, though, the Common Language Facility Identifier is well known, so no further explanation need be given. FIG. 8 illustrates the centralized testing database 30 as a table 122 that maps, relates, or otherwise associates the test results 28 to different circuit identifiers 110 and/or to different facility identifiers 120. The table 122 may also associate the test results 28 to the testing component 22 and to the test name 82 (as earlier paragraphs explained). If a test is requested involving a circuit identifier 110 and/or a facility identifier 120, then the mirroring application 52 need only retrieve the corresponding test results 28 from the centralized testing database 30. Again, duplicate testing is avoided and network resources are conserved.

Figure 9:
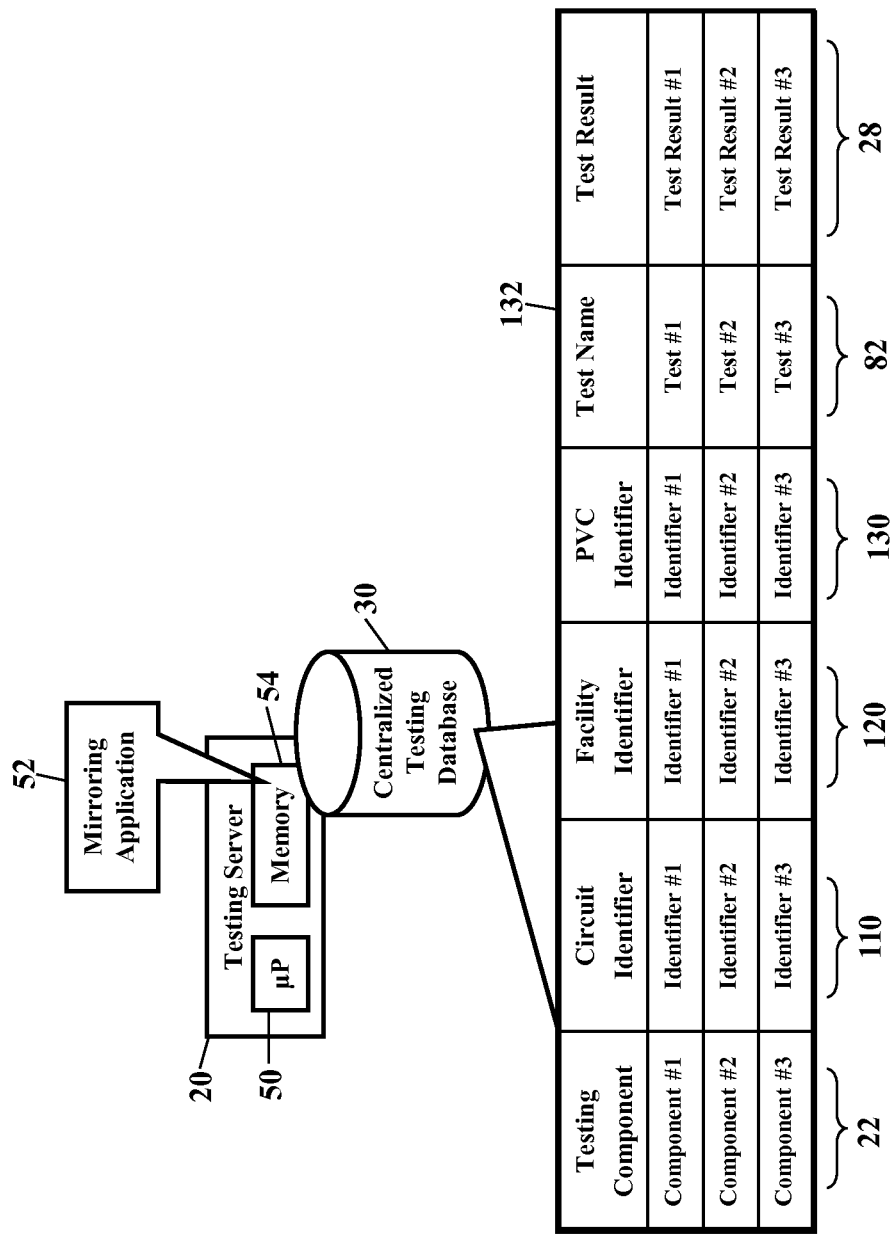
FIG. 9 is another detailed schematic illustrating the centralized testing database and permanent virtual circuit identifiers, according to exemplary embodiments.

FIG. 9 is yet another detailed schematic illustrating the centralized testing database 30, according to exemplary embodiments. Here the test results 28 may be additionally or alternatively be sorted and/or grouped by a Permanent Virtual Circuit (or "PVC") identifier 130. Each Permanent Virtual Circuit identifier 130 may be another alphanumeric combination that identifies a virtual circuit. The virtual circuit provides the equivalent of a dedicated private line service over a packet switching network between two predefined stations. The path between users is fixed and the Permanent Virtual Circuit uses a fixed logical channel to maintain a permanent association. FIG. 9 illustrates the centralized testing database 30 as a table 132 that maps, relates, or otherwise associates the test results 28 to different PVC identifiers 130. The table 132 may also associate the test results 28 to the testing component 22 and to the test name 82 (as earlier paragraphs explained). If a test is requested involving a PVC identifier 130, then the mirroring application 52 need only retrieve the corresponding test results 28 to avoid duplicate testing.

Figure 10:
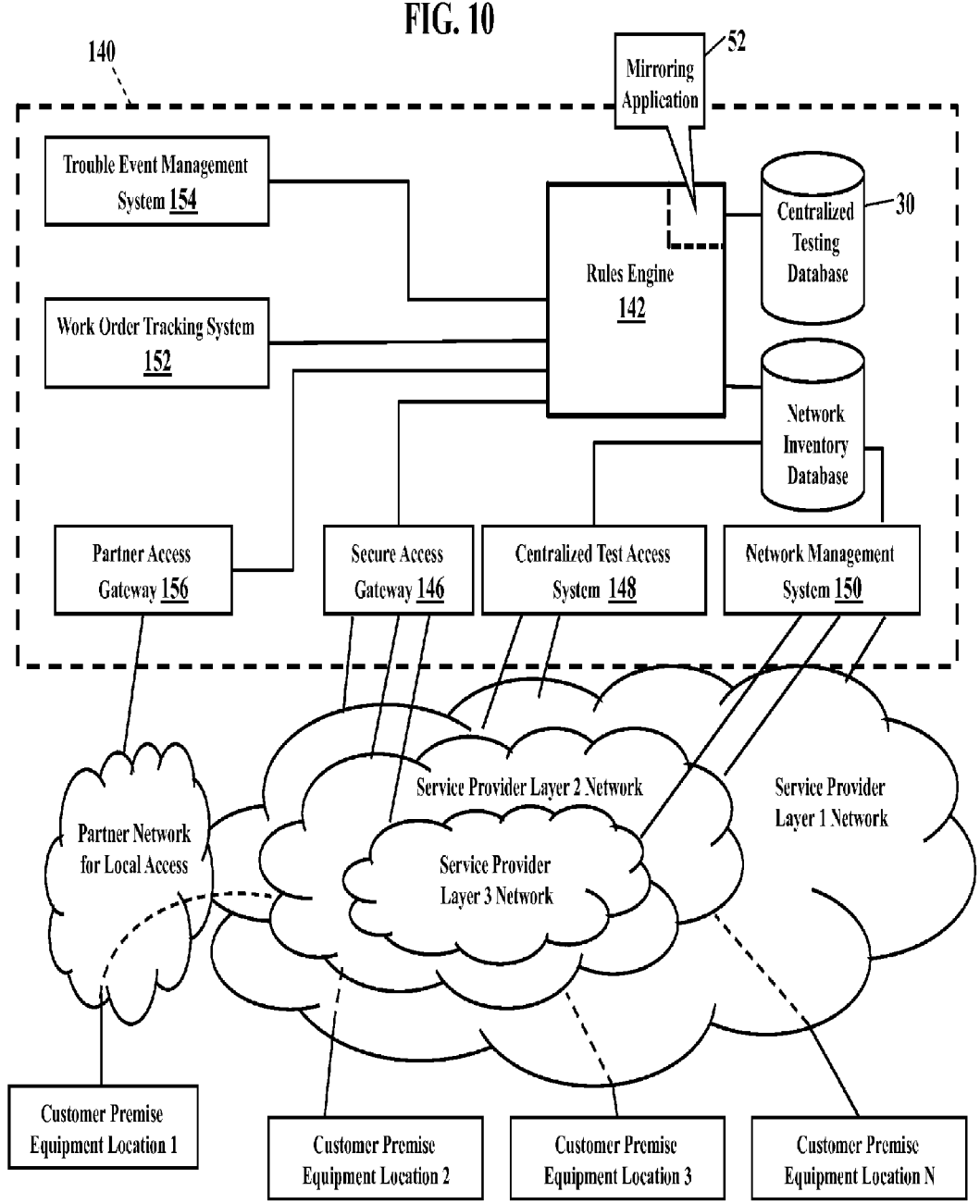
FIG. 10 is a detailed schematic illustrating an architecture for reflective maintenance of networks, according to exemplary embodiments.

FIG. 10 is a detailed schematic illustrating an architecture for reflective maintenance of networks, according to exemplary embodiments. Here the centralized testing database 30 is implemented in an intelligent layer 140 of the communications network 24. A rules engine 142 executes the mirroring application 52 to collect test results from various testing applications. The mirroring application 52, for example, may interface with a Secure Access Gateway 146, a Centralized Test Access System 148, and a Network Management System 150. The mirroring application 52 may also interface with a work order tracking system 152, a Trouble Event Management System 154, and a Partner Access Gateway 156. All these systems and/or platforms are well known to those of ordinary skill in the art and need not be further discussed. The mirroring application 52 causes the rules engine 142 to analyze test requests, sort testing results, check the centralized testing database 30, and control test invocations to eliminate duplicate tests on the same root cause.

Reflective Maintenance may thus build a reflective test layer and mirror test repository to deal with the problems ranging from facility/device failure to connectivity problem. The centralized testing database 30 integrates the various test results from different test applications, perhaps based on customer's circuit and facility layout. When any new tests are requested on the same circuit and facility, the centralized testing database 30 may be first checked. If the same root cause is still persistent, then additional testing may be wasteful. Instead, the mirrored test results 28 may be provided. By doing so, many exhaustive Level 1, Level 2, and Level 3 tests of the communications network 24 may be avoided. The centralized testing database 30 thus gathers testing data across all layers and on any components of the communications network 24. The centralized testing database 30 prevents duplicate testing on the same root cause and provides first-hand trouble analysis to benefit customer interface agents and technicians.

Reflective Maintenance thus promotes zero-touch service assurance automation. Reflective Maintenance supports service assurance initiatives, prevents duplicate tests, and saves network resources. Reflective Maintenance provides faster times to resolution of customer problems and improves operations efficiency. Reflective Maintenance may also elevate customer satisfaction by providing value-added services, thus maintaining the clientele base and even winning over new customers. Reflective Maintenance preserves or enhances overall productivity by releasing testing resources to other manually or mechanized processes, such as test and activation of new services.

FIGS. 11A & B are detailed schematics illustrating a layout and process for reflective maintenance of networks, according to exemplary embodiments. FIG. 11-A illustrates a network layout to support service offerings such as virtual private networks, managed Internet service, frame relay, and asynchronous transfer mode. FIG. 11-B illustrates diagnostic steps that may be useful in mirroring test results to the centralized testing database (illustrated as reference numeral 30 in FIGS. 1-10). These diagnostic steps may be automation steps conducted by the rules-based engine (illustrated as reference numeral 142 in FIG. 10). For example, when a trouble ticket was created on a customer circuit ID or IP address (either by a human being or an automated ticketing system) due to a service impacting problem, the trouble ticket routed to the rules-based engine 142. The rules-based engine 142 may then engage various testing systems (such as the Secure Access Gateway 146, the Centralized Test Access System 148, and the other applications illustrated in FIG. 10) to conduct automated troubleshooting processes to identify the root cause. FIG. 11-B illustrates the automated diagnostic test steps:

Step 1: Check local provider edge (PE) port status;
Step 2: Test SONET network (intelligent optical network) if PE port is down;
Step 3: Test local access when SONET network is OK;
Step 4, 5, 6: Test backbone network between local PE and remote PE;
Step 7, 8: Check remote PE port status;
Step 9, 10, 11, 12: Check remote access and network.

Once rules-based engine 142 previously completed these steps and located the root cause, the rules-based engine 142 may end and all the testing results would be lost. The rules-based engine 142 had to repeat these steps again if a new trouble ticket is created based on the similar problem. If ticket volume is high, then the testing points related to these steps would be very busy and testing resources would be constrained due to excessive queuing of requests leading to unacceptable delays or test request failures due to excessive delay in test execution. Exemplary embodiments, however, cause the rules engine 142 to mirror the test results 28 to the centralized testing database 30 to eliminate duplicate tests on the same root cause.

FIGS. 12-15 are flowcharts illustrating a method for reflective maintenance, according to exemplary embodiments. The centralized testing database 30 is built as a repository for test results (Block 170). The test results may be associated to their corresponding circuit identifier 110, facility identifier 120, and/or Permanent Virtual Circuit (or "PVC") identifier 130 (Block 172). A subscription is made to trouble ticket events from the work order tracking system 152 and/or the Trouble Event Management System ("TEMS") 154 (Block 174). A customer's circuit layout and facility data is retrieved (Block 176). The centralized testing database 30 is queried for the corresponding circuit identifier 110 (Block 178). If the circuit identifier 110 is found in the centralized testing database 30 (Block 180), then trouble has already been reported with the circuit. The test results associated with the circuit identifier 110, the facility identifier 120, and/or the Permanent Virtual Circuit identifier 110 are retrieved (Block 182). The root cause is located from the test results of various network layers (Block 184).

If the root cause of the problem is not determined (Block 186), then the unknown trouble is logged, and the trouble ticket is kept in the current work center (Block 188). If, however, the root cause of the problem is determined, then the flowchart continues with FIG. 13. The source or root cause of the trouble is logged and the appropriate application (or customer) is notified for resolution (Blocks 190-196).

Figure 12:
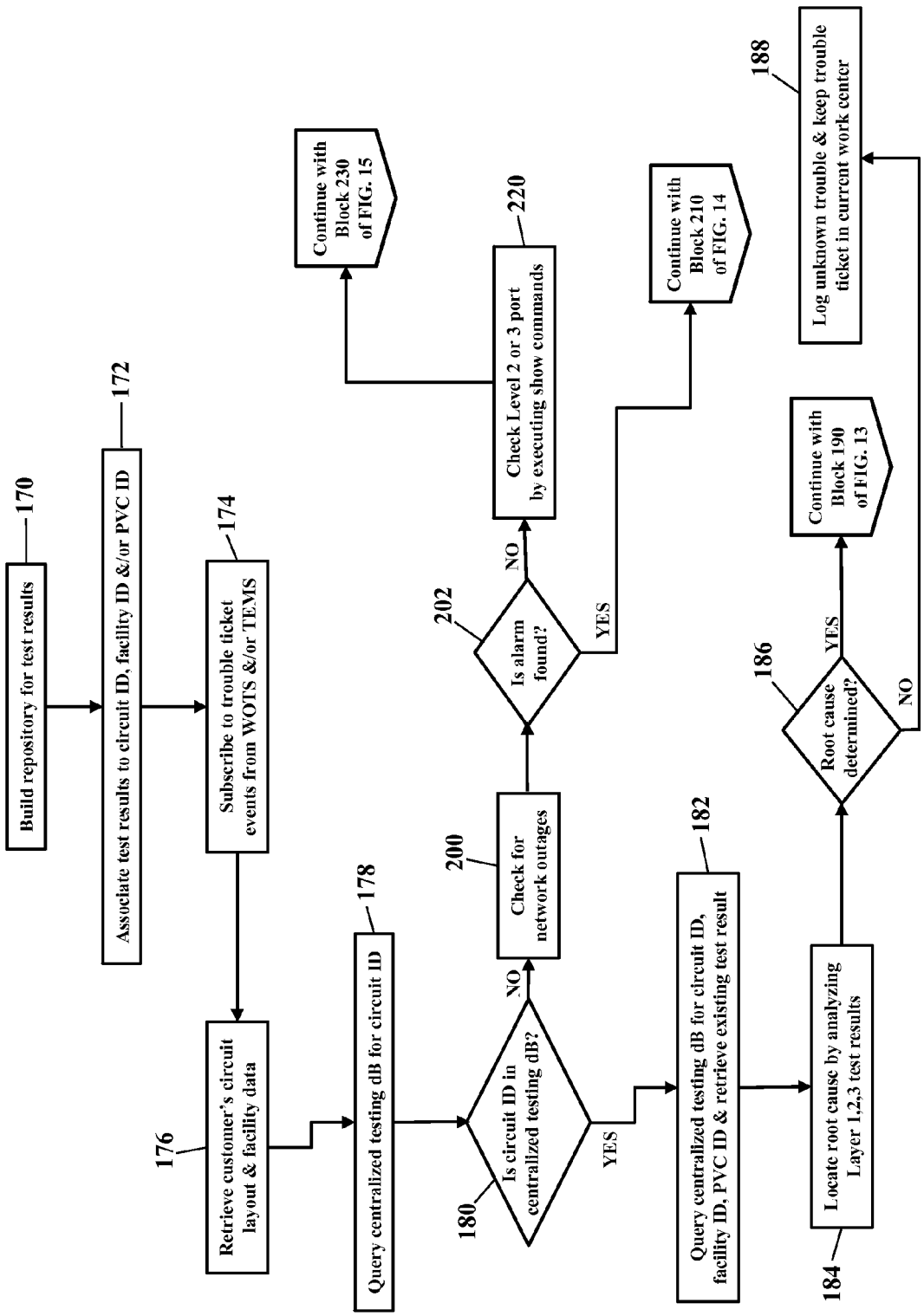
FIGS. 12-15 are flowcharts illustrating a method for reflective maintenance, according to exemplary embodiments.
Figure 13:
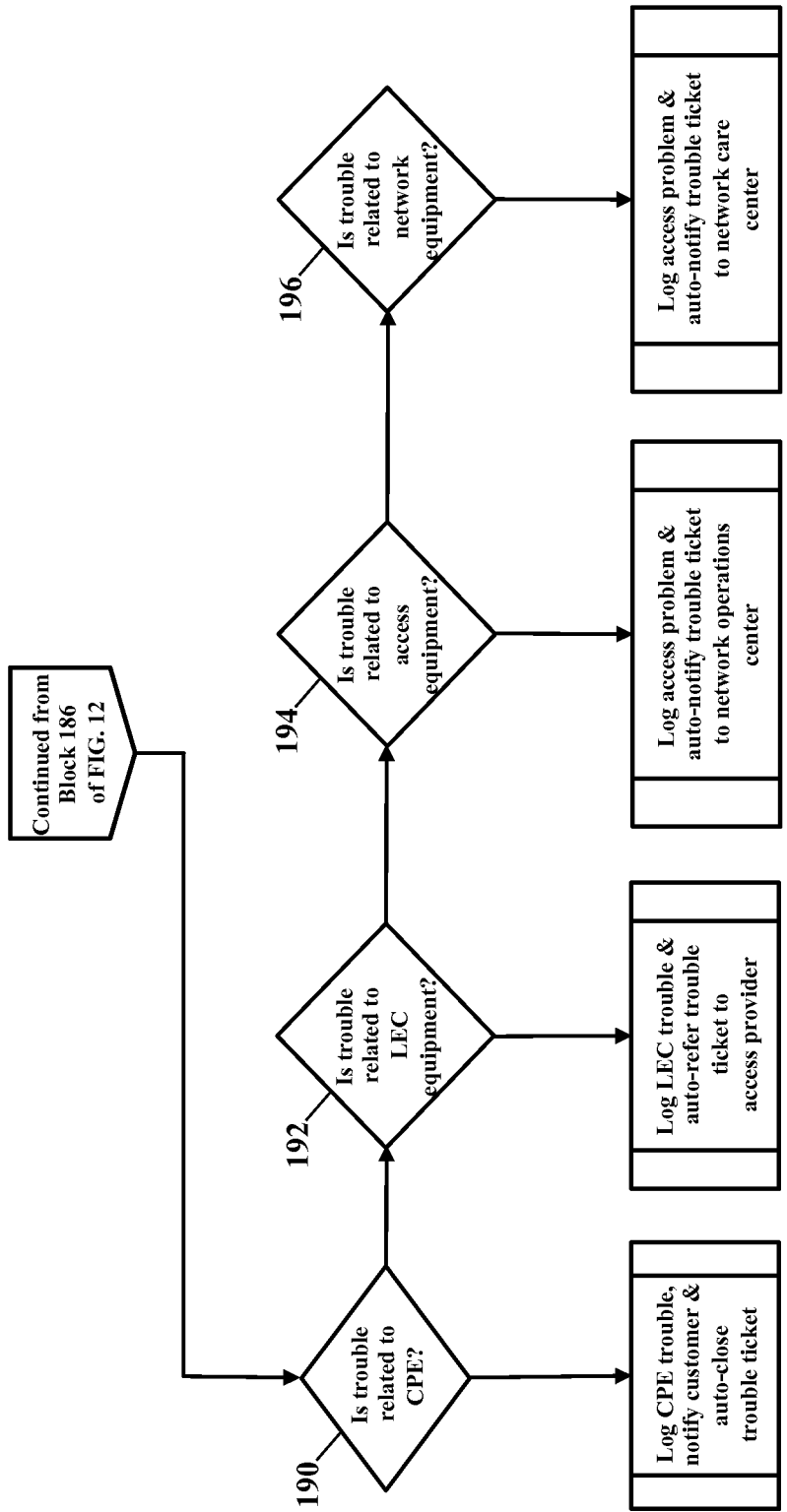
Figure 14:
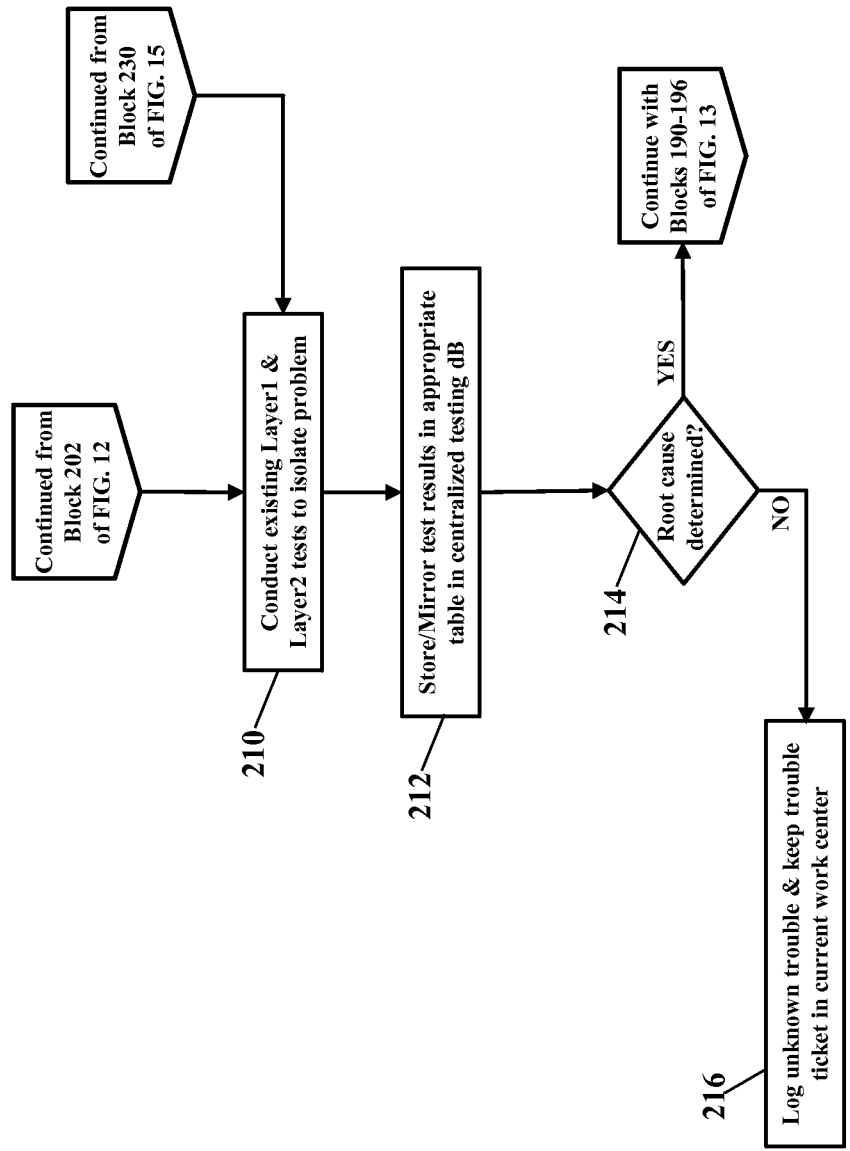
Figure 15:
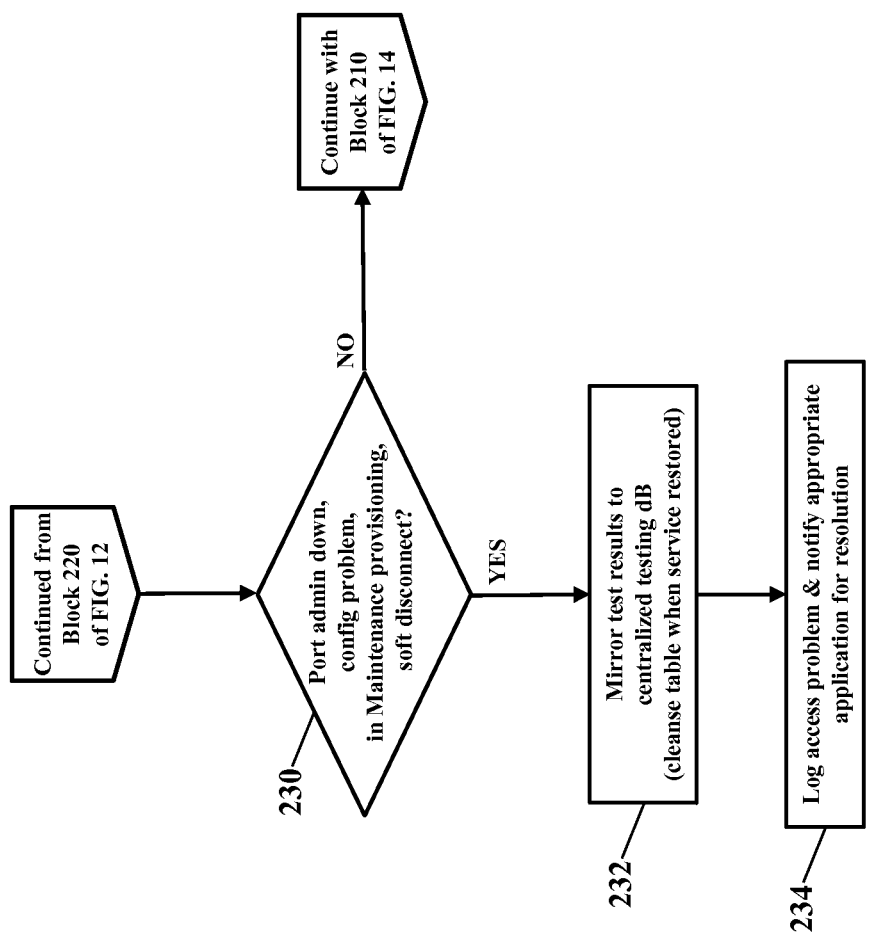

As FIG. 12 illustrates, the trouble, however, may be new and reported. If the circuit identifier 110 is not found in the centralized testing database 30 (Block 180), then a check is made for network outages (Block 200). If any alarms are found (Block 202), then the flowchart continues with FIG. 14. Tests are performed to isolate the problem (Block 210) and the test results are mirrored and stored in the centralized testing database 30 (Block 212). Once the root cause of the problem is determined (Block 214), then the flowchart returns to Blocks 190-196 of FIG. 13. If the root cause of the problem is not determined (Block 214), then the unknown trouble is logged, and the trouble ticket is kept in the current work center (Block 216).

If alarms are not found (Block 202 of FIG. 12), then different network ports are tested (Block 220). The flowchart then continues with Block 230 of FIG. 15. If the problem is related to the network ports (Block 230), then the test results are mirrored and stored in the centralized testing database 30 (Block 232). An access problem is logged and the appropriate application is notified for resolution (Block 234). If, however, the problem is unrelated to the network ports (Block 230), then the flowchart returns to Block 210 of FIG. 14. Testing is performed to isolate the problem (Block 210), and the test results are mirrored and stored in the centralized testing database 30 (Block 212). Once the root cause of the problem is determined (Block 214), then the flowchart returns to Blocks 190-196 of FIG. 13. If the root cause of the problem is not determined (Block 214), then the unknown trouble is logged, and the trouble ticket is kept in the current work center (Block 216).

Figure 16:
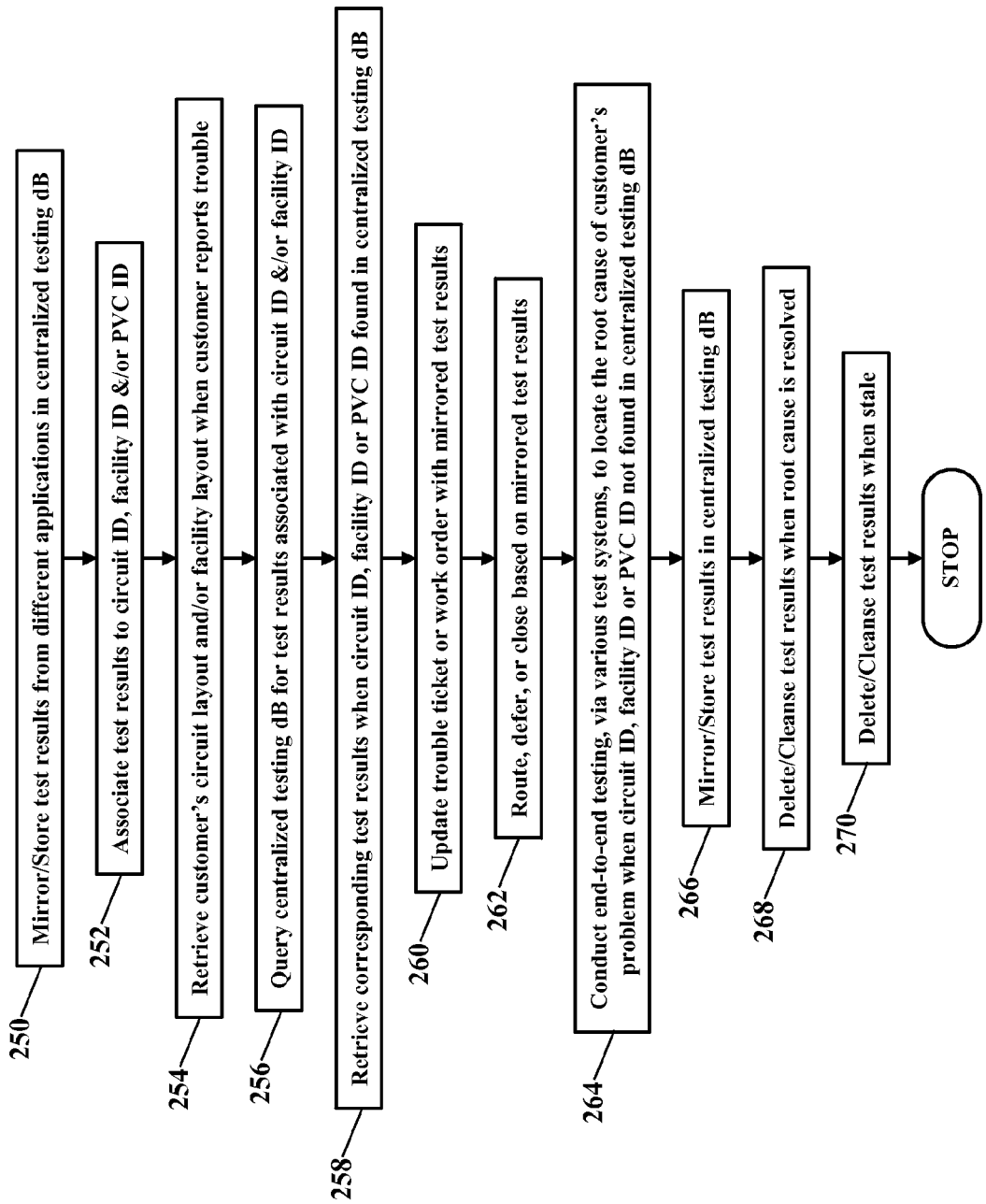
FIG. 16 is a flowchart further illustrating the method for reflective maintenance, according to exemplary embodiments.

FIG. 16 is another flowchart further illustrating the method for reflective maintenance, according to exemplary embodiments. Test results from different applications are mirrored and stored in the centralized testing database 30 (Block 250). The test results may be associated to their corresponding circuit identifier 110, facility identifier 120, and/or Permanent Virtual Circuit (or "PVC") identifier 130 (Block 252). When a customer reports trouble, the customer's circuit layout and/or facility layout is retrieved (Block 254). The centralized testing database 30 is then queried for test results associated with the customer's circuit identifier 110 and/or facility identifier 120 (Block 256). If the customer's circuit identifier 110 and/or facility identifier 120 is found in the centralized testing database 30, then the corresponding test results 28 are retrieved (Block 258). A trouble ticket or work order is updated with the mirrored test results (Block 260). The trouble ticket or work order is then routed, deferred, and/or closed based on the test results 28 (Block 262). When, however, the customer's circuit identifier 110 and/or facility identifier 120 is not found in the centralized testing database 30, then end-to-end testing, via various test systems, is conducted to locate the root cause of the customer's problem (Block 264). The test results 28 are mirrored and stored in the centralized testing database 30 (Block 266). When the root cause is resolved or fixed, then the test results 28 are deleted/cleansed from the centralized testing database 30 (Block 268). The test results 28 may also be deleted/cleansed from the centralized testing database 30 when stale (Block 270).

FIG. 17 is a schematic illustrating still more exemplary embodiments. FIG. 17 is a generic block diagram illustrating the mirroring application 52, and/or the client-side mirroring application 72, operating within a processor-controlled device 300. The mirroring application 52 has been previously illustrated as operating within the testing server 20. As this disclosure explained, though, the mirroring application 52 may operate in any processor-controlled device 300. FIG. 17, then, illustrates the mirroring application 52 stored in a memory subsystem of the processor-controlled device 300. FIG. 17 also illustrates the client-side mirroring application 72 operating within the processor-controlled device 300. One or more processors communicate with the memory subsystem and execute the mirroring application 52 and/or the client-side mirroring application 72. Because the processor-controlled device 300 is well-known to those of ordinary skill in the art, no detailed explanation is needed.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for reflective maintenance of communications networks, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for reflective maintenance of a network, comprising:
mirroring in memory test results from different testing applications to a centralized testing database;
associating, by a processor, the test results to circuit identifiers;
receiving notification of trouble associated with a circuit identifier;
prior to performing a test of a circuit to resolve the trouble, querying the centralized testing database for the circuit identifier; and
retrieving a test result associated with the circuit identifier.

2. The method according to claim 1, further comprising clearing the test result from the centralized testing database.

3. The method according to claim 1, further comprising clearing the test result from the centralized testing database when the trouble is resolved.

4. The method according to claim 1, further comprising associating the test results to facility identifiers.

5. The method according to claim 4, wherein prior to performing the test of the circuit, querying the centralized testing database for one of the facility identifiers and retrieving the test result associated with the one of the facility identifiers.

6. The method according to claim 1, further comprising performing the test of the circuit when the centralized testing database stores no test results associated with the circuit identifier.

7. The method according to claim 6, further comprising mirroring a result of the test to the centralized testing database.

8. The method according to claim 7, further comprising clearing the result of the test from the centralized testing database.

9. A system, comprising:
   a processor; and
   memory for storing code that when executed causes the processor to perform operations, the operations comprising:
   mirroring test results from different testing applications to a centralized testing database;
   associating the test results to circuit identifiers;
   receiving notification of trouble associated with a circuit identifier;
   prior to performing a test of a circuit to resolve the trouble, querying the centralized testing database for the circuit identifier;
   retrieving a test result associated with the circuit identifier; and
   updating a work order with the test result.

10. The system according to claim 9, further comprising code that causes the processor to clear the test result from the centralized testing database when the trouble is resolved.

11. The system according to claim 9, further comprising code that causes the processor to associate the test results to facility identifiers.

12. The system according to claim 11, further comprising code that causes the processor to query the centralized testing database prior to performing the test of the circuit to retrieve the test result associated with one of the facility identifiers.

13. The system according to claim 9, further comprising code that causes the processor to perform the test of the circuit when the centralized testing database stores no test results associated with the circuit identifier.

14. The system according to claim 13, further comprising code that causes the processor to mirror a result of the test to the centralized testing database.

15. The system according to claim 14, further comprising code that causes the processor to clear the result of the test from the centralized testing database.

16. A computer readable memory storing instructions that when executed cause a processor to perform operations, the operations comprising:
   mirroring test results from different testing applications to a centralized testing database;
   associating the test results to circuit identifiers;
   receiving notification of trouble associated with a circuit identifier;
   prior to performing a test of a circuit to resolve the trouble, querying the centralized testing database for the circuit identifier;
   retrieving a test result associated with the circuit identifier; and
   updating a work order with the test result.

17. The computer readable memory according to claim 16, further comprising instructions for performing the test of the circuit when the centralized testing database stores no test results associated with the circuit identifier.

18. The computer readable memory according to claim 17, further comprising instructions for mirroring a result of the test to the centralized testing database.

19. The computer readable memory according to claim 16, further comprising instructions for associating the test results to facility identifiers.

20. The computer readable memory according to claim 19, further comprising instructions for querying the centralized testing database prior to performing the test of the circuit and retrieving the test result associated with one of the facility identifiers.

* * * * *